(No Model.) 3 Sheets—Sheet 2.
M. A. T. BOEHNCKE & H. ROHWER.
CONTINUOUS BRICK KILN.
No. 323,492. Patented Aug. 4, 1885.
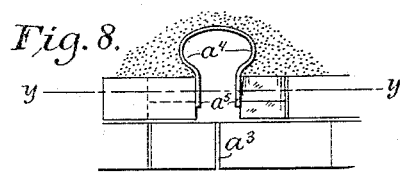
Fig. 8.
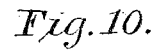
Fig. 10.
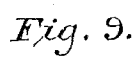
Fig. 9.
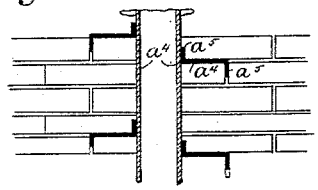
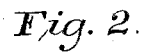
Fig. 2.
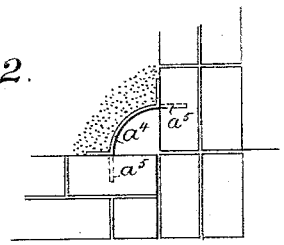
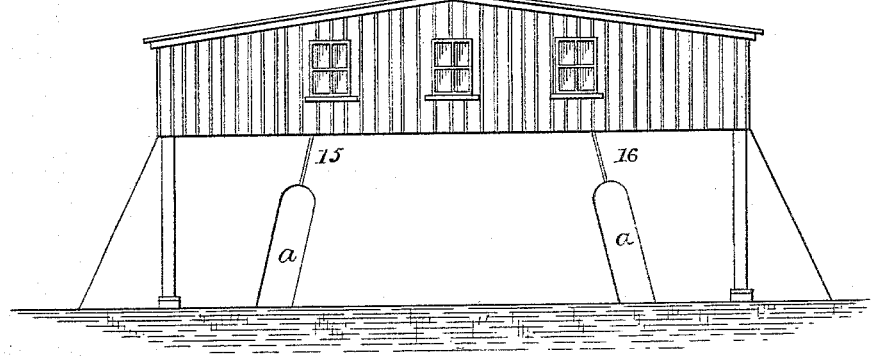
Fig. 3.
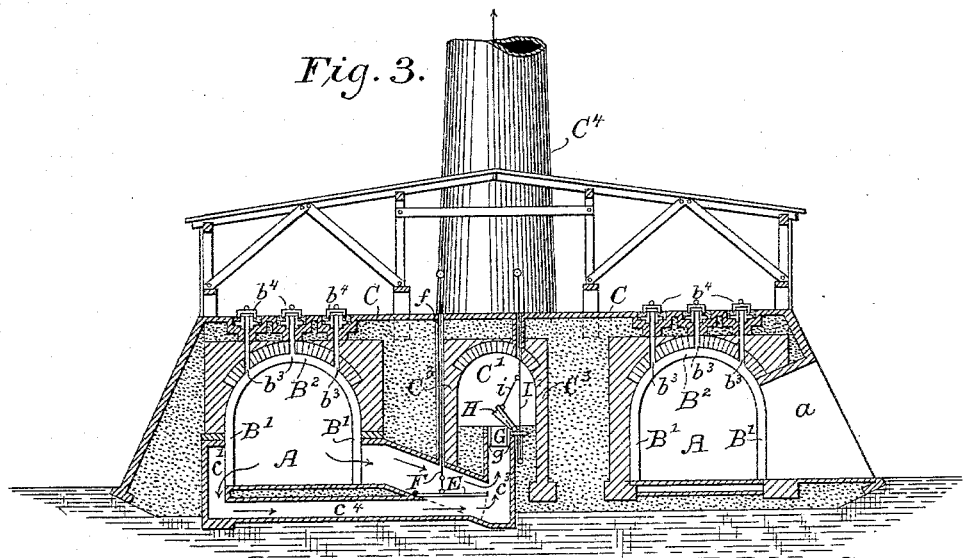
Witnesses
Jos. S. Latimer
F. B. Noyes
Inventors
Max A. Th. Boehncke,
Henry Rohwer,
by their Attorney,
J. R. Littell (No Model.) 3 Sheets—Sheet 3.
M. A. T. BOEHNCKE & H. ROHWER.
CONTINUOUS BRICK KILN.
No. 323,492. Patented Aug. 4, 1885.
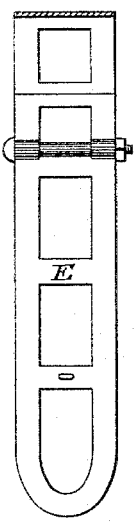
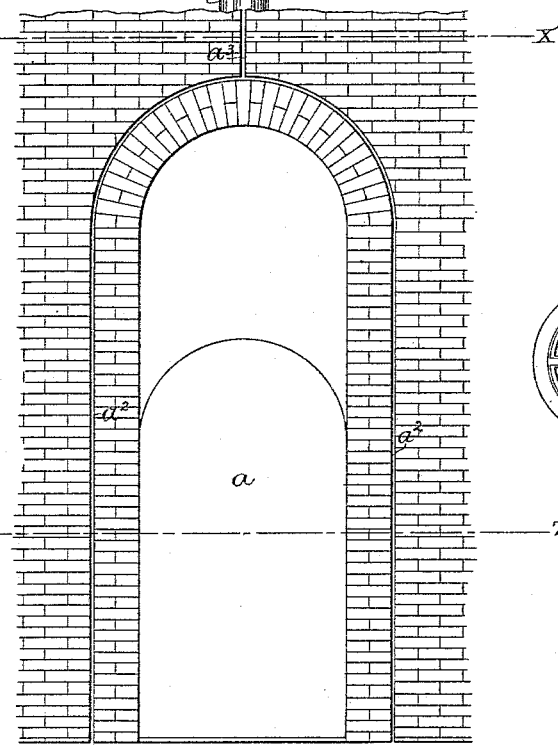
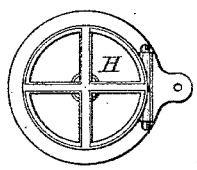
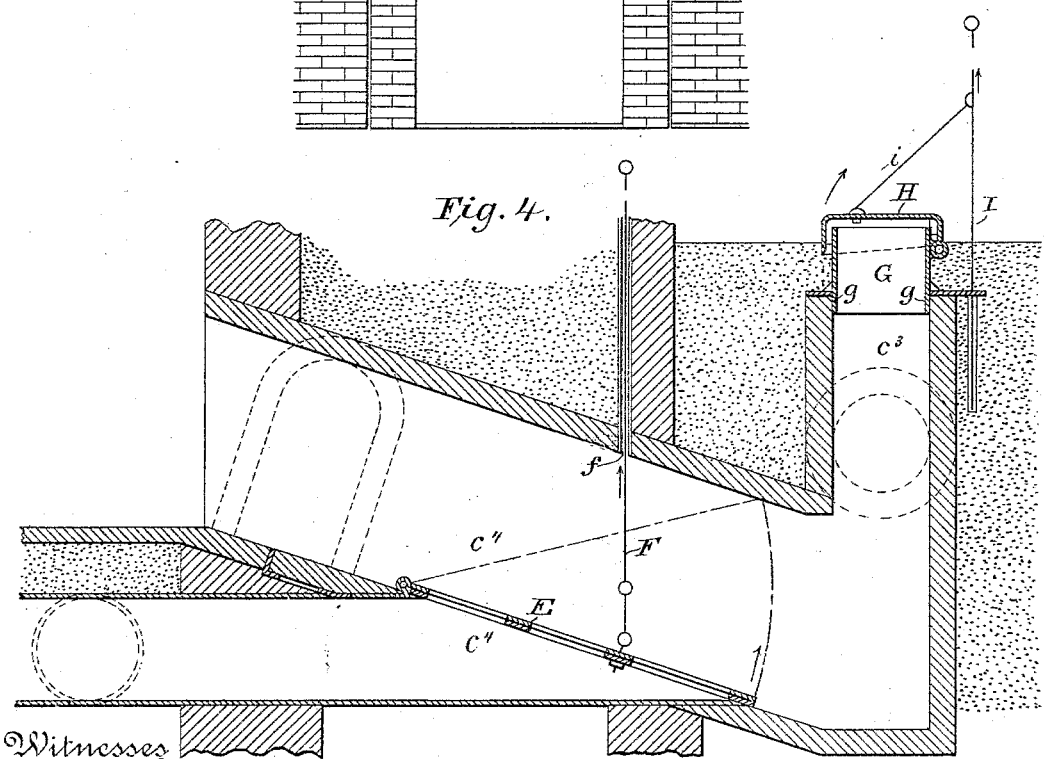
Witnesses
Jos. S. Lahmer
F. B. Noyes.
Inventors
Max A. Fh. Boehncke,
Henry Rohwer,
by their Attorney,
J. R. Littell.

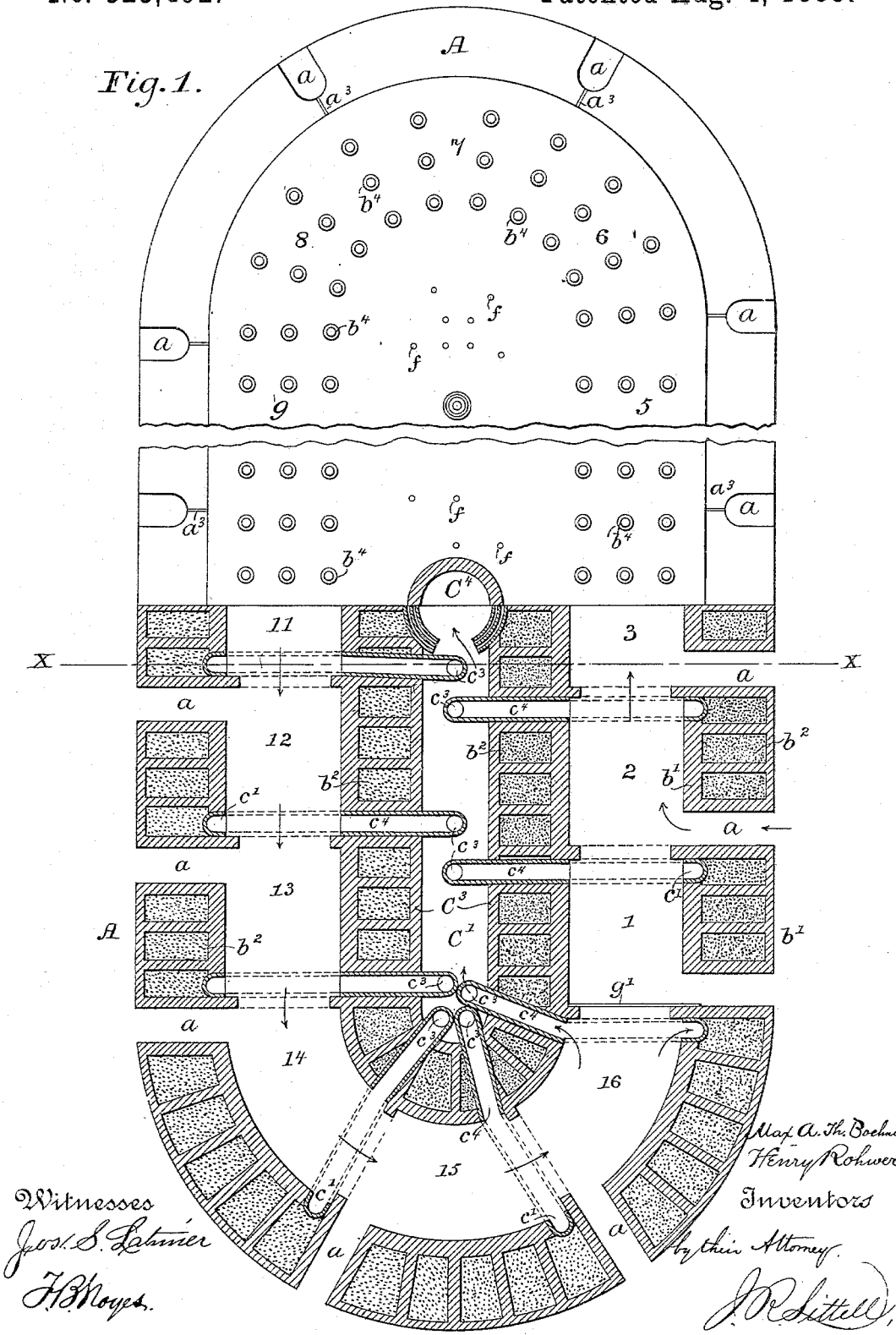

UNITED STATES PATENT OFFICE.

MAX A. TH. BOEHNCKE AND HENRY ROHWER, OF OMAHA, NEBRASKA.

CONTINUOUS BRICK-KILN.

SPECIFICATION forming part of Letters Patent No. 323,492, dated August 4, 1885.

Application filed February 2, 1885. (No model.)

*To all whom it may concern:*

Be it known that we, MAX A. TH. BOEHNCKE and HENRY ROHWER, citizens of the United States, residing at Omaha, in the county of Douglas and State of Nebraska, have invented certain new and useful Improvements in Continuous Brick-Kilns; and we do hereby declare that the following is a full, clear, and exact description of the invention, which will enable others skilled in the art to which it appertains to make and use the same.

Our invention relates to a continuous brick-kiln; and it consists in the improved construction and combinations of parts hereinafter fully described, and pointed out in the claims, whereby a kiln is provided which shall be simple in its construction and effective in its operation.

In the drawings, Figure 1 is a plan view of a brick-kiln constructed in accordance with our invention, a part of the same (one section or half) being shown in horizontal section. Fig. 2 is an end elevation of a completed kiln, showing the same provided with a housing and chimney. Fig. 3 is a transverse vertical section of the kiln, said section being taken on the line $x$ $x$ of Fig. 1. Fig. 4 is an enlarged detail view of one of the flues shown in Fig. 3, and the arrangement of a regulator and damper. Fig. 5 is a plan view of the regulator. Fig. 6 is a detail view of one of the dampers employed. Fig. 7 is a detail view of one of the entrance-openings to the kiln. Fig. 8 is a detail section on the line $X^2 X^2$, Fig. 7. Fig. 9 is a detail section on the line $Y Y$, Fig. 8. Fig. 10 is a detail section on the line $Z Z$, Fig. 7.

In the accompanying drawings, in which like letters of reference indicate corresponding parts in all the figures, A represents the kiln, which is preferably oval in horizontal section, which is divided into any number of compartments, in this case sixteen, which, for sake of convenience, will be numbered from 1 to 16, inclusive.

Kilns 1, 2, 3, 11, 12, 13, 14, 15, and 16 are shown in the horizontal section portion of the kiln of Fig. 1. The compartments 4, 5, 6, 7, 8, 9, and 10 are not shown; but as they are of the same construction as the others above referred to, a description or illustration thereof is not thought to be necessary. These several compartments, from 1 to 16, inclusive, although shown as communicating, may, when necessary, be separated by a removable partition, $g'$, as will be more fully described.

Communicating with each of the compartments, preferably at one side of the same, are arched openings or passages $a$, and surrounding said openings a short distance from their edges or faces are spaces or crevices $a^2$, which communicate with a vertical crevice or opening, $a^3$, said crevices or spaces extending through the entire thickness of the wall, and being closed at their inner ends—that is, on the inside of the wall—preferably by self-adjustable sheet-metal strips $a^4$, having flanges $a^5$, as shown, which prevent the escape of the filling of sand or like material, which is placed between the walls of the kiln and the compartments, as clearly shown in Fig. 3. By this arrangement of spaces or crevices the cracking of the surrounding walls, caused by the expansion and contraction of the inclosing-walls of the chambers when the same are under strain of heat or are cooling off, is prevented, and by placing the self-adjustable sheet-metal strips at the inner sides of said crevices or spaces, the escape of sand or other filling material is prevented.

The walls of the kiln, as will be seen from an inspection of Fig. 1, are composed of two thicknesses of material placed a suitable distance apart, and these two walls $b'$ are in turn divided into a series of smaller compartments, $b^2$, in each of which is a filling of sand or other suitable material, to prevent the escape of heat from the kiln. Each of the compartments, numbered from 1 to 16, consists of the side walls, B', having preferably an arched ceiling, B², as shown in Fig. 3, and between said arched ceiling and the top surface, C, of the kiln is a filling of sand or like material. A series of feed-openings, $b^3$, communicate with the said compartment from the top surface, by which fuel may be introduced to the same, said passages $b^3$ being bricked, and enlarged at their upper ends to form seats to receive and support caps $b^4$ or covers for said openings.

The outer walls of the several compartments from 1 to 16, are formed upon their outer sides, near the lower ends thereof, with openings $c'$, which extend downwardly a slight distance, and from thence the openings or passages extend inwardly and communicate with vertical passages $c^3$, which communicate with a chamber or passage, C′, extending nearly the entire length of the kiln, said flue or passage, as shown in Fig. 3, being composed of side walls, $C^3$, connected by an arched ceiling. Each of the side walls of this flue or passage C′ consists of two thicknesses, and the said side walls are divided, like the walls of the kiln, into compartments having a filling of sand or like material. As will be seen, all the compartments, from 1 to 16, inclusive, have communication with the flue or passage C′, and said flue or passage is provided midway between its ends with a chimney, $C^4$.

The floor of each of the compartments is composed of two thicknesses of material, arranged a suitable distance apart, and having between said thicknesses a filling of sand or like material, the faces of said bottoms or floors being connected at their under side with openings or passages $c^4$, formed in the compartments, said passages communicating with the vertical passages $c^3$, leading to the chamber or passage C′. It will thus be seen that two flues are provided. By this arrangement we are enabled to change the draft (by a regulator to be described) at will, according to circumstances, and produce a perfect and uniform result in burning, and also save fuel. Hinged or pivoted to the floors of the several inner flues, $e^4$, from 1 to 16, are regulators E, which extend inwardly, and are adapted to close communication between either of the flues $c'$ and $c^4$ and the chamber C′, or held in a horizontal position with relation thereto to allow communication with said chamber. Jointed rods F are connected with said regulators, about midway between the ends of the same, said jointed rods extending through vertical openings or passages $f$ to the top of the kiln, from which point they are adapted to be operated.

G represents pipes or cylinders, having near their lower ends circumferential flanges $g$. These pipes or cylinders G are adapted to be placed at the upper ends of the vertical passages $c^3$, the flanges on the same resting upon the upper end of the walls of said passages, whereby they are firmly supported. The said pipes or cylinders G are provided with hinged caps or covers H, having the downturned edges to adapt them to the form of the upper ends of said pipes and inclose the same. Rods I, working in holes or openings in the top of the chamber C′, are provided, said rods having their lower ends located and working in holes or openings at one side of the passages $c^3$, and passing through holes or openings in the flanges of the pipes or tubes. The said rods I are connected with the caps or dampers to raise and lower the same by arms $i$. It will thus be seen that said dampers may be raised and lowered to establish and cut off communication between the kiln and the smoke chamber or passage C′. By the employment of these dampers we are enabled to keep the draft under complete control.

The operation is as follows: Assuming that the process of burning is going on and the compartments are numbered from 1 to 16, as in the present case, all the compartments, with the exception of 1, 2, and 3, are filled with the material either to be burned or having been burned, and the movable partition $g'$ placed between chambers 1 and 16, all the doorways, with the exception of 1, 2, and 3, are temporarily closed with brick-work, and all the flues, with the exception of the ones for the compartment 16, are closed by their dampers H. To-day compartment No. 1 is being filled with raw material, chamber 2 is kept vacant for convenience sake, and chamber 3 is being emptied of the material already burned. To-morrow the movable partition $g'$ is placed between 1 and 2, the passage to compartment 1 is closed, while passage to compartment 4 is opened. The flues of compartment 16 are closed by their damper H, and damper for compartment 1 is opened. Now compartment 2 is filled, 3 empty, and burned material is removed from 4, and so on, keeping it working continually. Fuel is supplied one day to compartment 9 and the next day to the adjacent compartment in numerical order. Every day, therefore, the fire, the closing of one damper and opening another, closing and opening of doorways or entrance-openings advances one compartment.

The cold atmospheric air enters the kiln in the case assumed through the openings of compartments 1, 2, and 3, passes first compartment, 4, where the bricks or other goods are almost cold, and takes up their heat, then proceeds on to warmer bricks, &c., and then to hotter and hotter through the compartments 5, 6, 7, and 8, always carrying the heat of the cooling goods forward with it till it reaches compartment 9. There it gets a final accession of heat from the burning of a very small quantity of fuel, and by which it is enabled to bring the material in chambers 10 and 11 to a red-hot state, in chambers 12 and 13 less, and so on, and when approaching 16 still be warm enough to be used for drying the material brought in the day before, and with the smoke from the fuel and the vapor escaping from the green material passes through the flues into the passage or chamber C′, by means of which it is carried to chimney $C^4$, and thence to the open air.

As we are aware that continuous or progressive brick-kilns of various constructions have heretofore been devised we made no broad claim for them, the object of our present invention being to make the improvements in the construction and operation of such kilns as hereinbefore described, and for the purposes set forth.

We claim as our invention and desire to secure by Letters Patent—

1. A brick-kiln having a series of compartments, A, having flues leading from the inner side of said compartments to a central exit-passage, combined with the flues or pipes $c^4$, leading from the opposite side of said compartment beneath the floor of the compartment and communicating with the first-mentioned flue, substantially as shown and described.

2. A brick-kiln comprising burning-compartments A, having flues leading from the inner side thereof, and flues $c^4$, leading from the opposite side of said compartment, beneath the floor thereof, and joining the first-mentioned flue, combined with a damper hinged at the junction of the two flues, and means for operating the same, substantially as described.

3. A brick-kiln, the walls of which are made up of sections with spaces between them to allow of expansion by heat, substantially as described.

4. A brick-kiln, the walls of which are made in sections with spaces between them, combined with a strip of metal, $a^4$, secured to said sections at the spaces to prevent the exit of filling material, substantially as described.

In testimony whereof we affix our signatures in presence of two witnesses.

MAX A. TH. BOEHNCKE.
HENRY ROHWER.

Witnesses:
AUG. WEISS,
GEO. KARLL.